United States Patent
Nair et al.

[11] Patent Number: 5,911,115
[45] Date of Patent: *Jun. 8, 1999

[54] DATA TRANSMISSION OVER AMPS NETWORKS

[75] Inventors: N. Gopolan Nair; Zdenek Brun, both of Chandler, Ariz.

[73] Assignee: Intel Corporation, Santa Clara, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/414,907

[22] Filed: Mar. 31, 1995

[51] Int. Cl.⁶ ...................................................... H04B 1/62
[52] U.S. Cl. ............................ 455/63; 455/501; 375/285; 375/296
[58] Field of Search .............................. 455/69, 43, 50.1, 455/63, 52.1, 65, 67.1, 67.3, 73, 296, 33.1, 60, 58, 557; 375/221, 222, 284, 285, 296; 379/59

[56] References Cited

U.S. PATENT DOCUMENTS

| | | | |
|---|---|---|---|
| 4,561,111 | 12/1985 | Conner | 455/63 |
| 4,697,281 | 9/1987 | O'Sullivan | 379/59 |
| 4,787,094 | 11/1988 | Eguchi | 375/296 |
| 5,105,445 | 4/1992 | Karam et al. | 375/296 |
| 5,193,224 | 3/1993 | McNicol et al. | 455/126 |
| 5,241,565 | 8/1993 | Kloc et al. | 375/285 |
| 5,251,328 | 10/1993 | Shaw | 455/73 |
| 5,257,397 | 10/1993 | Barzegar et al. | 455/33.1 |
| 5,278,992 | 1/1994 | Su et al. | 455/69 |
| 5,289,459 | 2/1994 | Browlie | 370/17 |
| 5,386,590 | 1/1995 | Dolan | 455/33.1 |
| 5,574,771 | 11/1996 | Driessen et al. | 379/57 |
| 5,696,699 | 12/1997 | Nair | 364/514 R |

*Primary Examiner*—Wellington Chin
*Assistant Examiner*—Lee Nguyen
*Attorney, Agent, or Firm*—Blakely, Sokoloff, Taylor & Zafman LLP

[57] ABSTRACT a modem that measures the received signal, characterizes the aptitude and phase distortion of the received signal across the bandwidth of the communication channel and predistorts the signal that is transmitted such that the introduced predistortion and the distortion in the channel cancel each other.

15 Claims, 5 Drawing Sheets

DATA TRANSMISSION OVER AMPS NETWORKS

BACKGROUND OF THE INVENTION (1) Field of the Invention

The present invention relates to wireless data communications systems, and more particularly to measuring the distortion in a received signal and pre-distorting the transmitted signal to compensate for the measured distortion in the received signal.

(2) Description of the Related Art

Please refer to co-pending application Ser. No. 08/387,246 filed on Feb. 13, 1995 by N. Gopalan Nair, entitled USE OF CONTROL CHANNEL INFORMATION TO ENHANCE DATA THROUGHPUT OF AN INTEGRATED CELLULAR COMMUNICATION SYSTEM, and co-pending application Ser. No. 08/387,245 filed on Feb. 13, 1995 by N. Gopalan Nair, entitled INTEGRATED CELLULAR DATA/VOICE COMMUNICATION SYSTEM WORKING UNDER ONE OPERATING SYSTEM, where both co-pending applications are assigned to the same party as the present invention.

Modems are data communications devices that provide connections for computers into the public switched telephone network. A sending modem converts digital signals generated by computers to analog signals for transmission over the telephone system's limited bandwidth analog transmission lines. A receiving modem somewhere else in the telephone network converts the received analog signals back to digital signals and supplies them to the receiving computer.

Communication between two computers by modem is preceded by a signal exchange that establishes the parameters of the communication. For example one of the parameters established is data transmission speed. A second set of parameters exchanged deals with distortion in the transmission channel. All transmitted signals are susceptible to distortion, where distortion is defined as the received signal not being an exact replica of the transmitted signal. Some distortion is introduced by the medium through which the transmitted signals pass such as signal attenuation. Some distortion is due to outside interference such as background noise, storms, emf from machinery, multi path transmission interference, etc. All of these factors result in distortions in the ideal amplitude and phase characteristics of the transmission channel. With data transmission, distortion is more of a problem than with voice since the human brain can deal with a considerable degree of distortion and missing data and still capture the message. Not so with data transmission between computers. To deal with this problem, the prior art added circuitry to the receiving side of the modem that allowed the modem to compensate for some degree of distortion in the transmission channel. The level of distortion was determined by the modems at the beginning of each call by passing signals with known wave forms back and forth and measuring the distortion. Once the distortion was determined, distortion correction could be set and communicated to each modem. However, once set, distortion correction parameters remain constant for the duration of the call. This is, of course, an adequate solution if the communication channel consists of a circuit through a land based telephone network. This is true since once a circuit is established in a land based network, it does not change appreciably over the time of a typical data transmission.

The problem of distortion correction changes however if one or both of the communication points is mobile. In this case, the distortion characteristics of the transmission channel can change—sometimes radically—in very short periods of time. The most recent mobile data communication systems have attempted to deal with this problem by adding adaptive distortion compensation to modem receivers. Adaptive distortion correction is accomplished by adding logic and circuitry to the modem. The circuitry and logic monitors the incoming signal and makes periodic adjustments to the compensation electronics.

These schemes are useful and improve data integrity over a mobile data communication network. However, there are many times when such compensation is not adequate to deal with the degree of distortion present. When this is true, either the error rate increases or the data throughput decreases.

BRIEF SUMMARY OF THE INVENTION

The present invention reduces distortion introduced into a communication between a first and second modem connected by a transmission channel and wherein the communication consists of transmissions and receptions by each modem. The invention comprises means associated with the first modem for measuring the distortion introduced by the transmission channel into the signal received at the first modem and means associated with the first modem and communicating with the distortion measuring means and being adapted to introduce into the transmission from the first modem a pre-distortion signal component based upon the measured distortion but transformed such that the pre-distortion component of the transmission tends to cancel the distortion introduced into the transmission by the transmission channel. The invention is particularly useful when the first modem is connected to a mobile computer and communicates with the second modem over a cellular telephone network such that a portion of the transmission channel comprises a wireless connection between the first modem and a cellular base station.

The invention includes a method for reducing distortion introduced into a communication between a first and second modem connected by a transmission channel and wherein the communication consists of transmissions and receptions by each modem, the method comprising monitoring the received signal at the first modem, measuring the distortion introduced into the received signal by the transmission channel and pre-distorting the transmission that goes to the second modem such that the pre-distortion of the transmission tends to cancel the distortion introduced into the transmission by the transmission channel.

BRIEF DESCRIPTION OF THE DRAWINGS

A preferred embodiment will now be described in connection with the Drawing, wherein.

DETAILED DESCRIPTION OF THE INVENTION

The present invention observes and takes advantage of a usage pattern in the transmission of digital data between mobile locations. This pattern is that in nearly every instance, only one of the transmission nodes is mobile. The typical usage pattern has a traveling person communicating with a home office. While this pattern is not universally true, it fits the vast majority of situations.

In addition, the present invention observes and takes advantage of the fact that when one data transmission node is stationary, the distortion introduced by the transmission channel into a received signal will be substantially the same as the distortion introduced by the transmission channel into a signal that is being transmitted.

Accordingly, a modem that incorporates the present invention measures the received signal, characterizes the amplitude and phase distortion of the received signal across the bandwidth of the communication channel and pre-distorts the signal that is transmitted such that the introduced pre-distortion and the distortion in the channel cancel each other.

Figure 1:
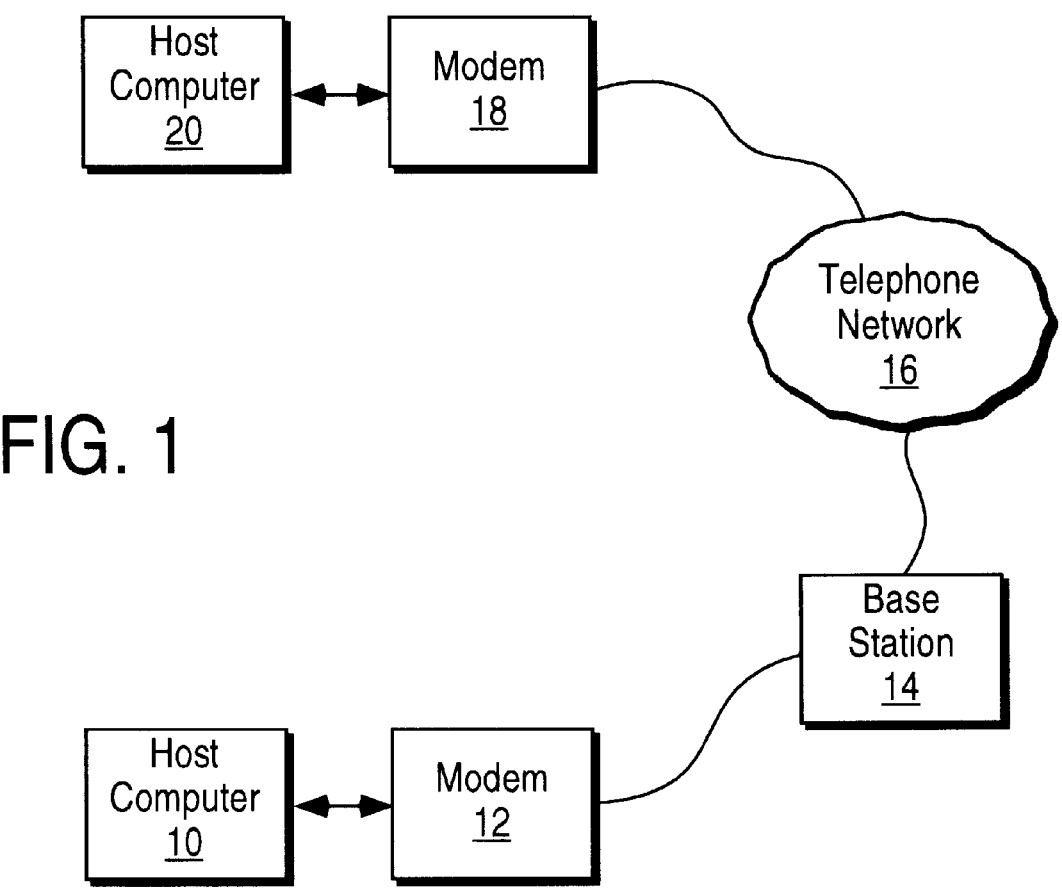
FIG. 1 is a block diagram illustrating the general setting of the invention.

FIG. 1 is a block diagram illustrating the general setting of the invention. Referring now to FIG. 1, computer 10 is connected to modem 12 which communicates with base station 14 through a radio frequency (r/f) transceiver in modem 12. Base station 14 which also includes a r/f transceiver is one of many transceivers that are at the heart of a cellular telephone network. Base station 14 communicates with hand held and car phones by r/f wireless transmission and is hardwired to telephone network 16. Telephone network 16 consists of land telephone lines and switching stations. In a typical user situation, a second modem 18 is connected directly, that is, for example, through a conventional RJ11 jack, to telephone network 16. A second computer 20 is connected to modem 18. The arrangement shown in FIG. 1 is the typical one for mobile communications. A mobile user is communicating with the office or other fixed point. Rarely are both communication points mobile. However, the present invention applies to such a situation.

Figure 2:
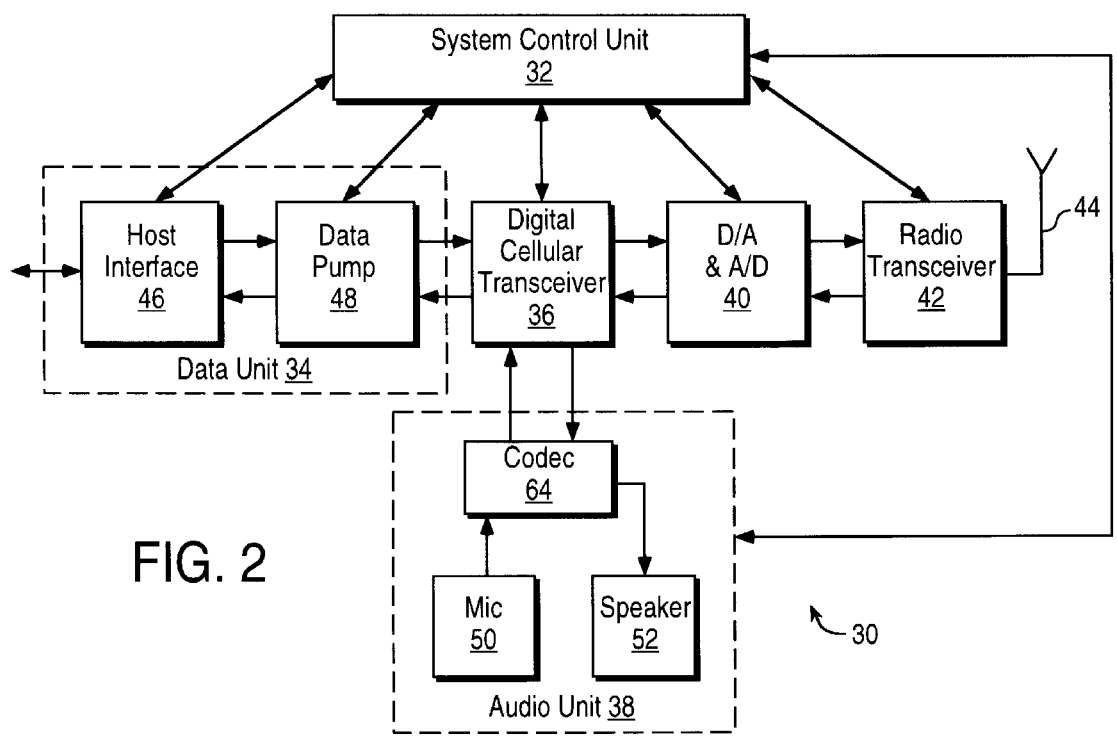
FIG. 2 is a digital wireless communication system operating under one system control unit necessary for the present invention.

In order to accomplish the pre-distortion operation, it is necessary to have an integrated cellular communication system as illustrated in the block diagram of FIG. 2. The integrated cellular communication system is described in detail in the two co-pending applications Ser. Nos. 08/387,245 and 08/387,246 referenced above. The description will be repeated in part herein to provide the context for the present invention. In FIG. 2, all of the components are operated under a single system control unit so that the various components of the system can be adapted and adjusted as the dynamic characteristics of the cellular channel change. Referring now to FIG. 2, wireless communication system 30 includes a system control unit 32 for controlling various components of wireless communication system 30. A data unit 34 processes data signals received from a computer host or data signals received from a digital cellular transceiver 36. An audio unit 38 processes audio signals that are received from digital cellular transceiver 36 or that are to be transmitted to digital cellular transceiver 36. Digital cellular transceiver 36 receives data signals from data unit 34 or audio signals from audio unit 38 and converts them into digital cellular signals. D/A & A/D converter 40 includes both D/A circuitry and an A/D circuitry. The D/A circuitry is used to convert digital cellular signals received from digital cellular transceiver 36 into analog cellular signals. The A/D circuitry is used to convert analog cellular signals received from radio transceiver 42 into digital cellular signals. Radio transceiver 42 which includes an antenna 44 communicates with base station 14 of FIG. 1 by conventional radio frequency (R/F) signals. However, two separate channels are used: a data channel and a voice channel.

Data unit 34 includes a host interface 46 for interfacing wireless communication system 30 to a host computer and a data pump 48 for performing modem signal processing.

Audio unit 38 includes a microphone 50, a speaker 52 and an encoder/decoder (CODEC) 54. Microphone 50 converts voice and other acoustic waves into electrical audio signals and supplies them to CODEC 54. Speaker 52 receives electrical audio signals from CODEC 54 and converts them into acoustic waves for the user to hear. CODEC 54 is in essence a digital signal processor that converts an audio signal into a digital bit stream representing the audio signal in the digital domain and visa versa.

Digital cellular transceiver 36 processes digital data signals. Because digital cellular transceiver 36 processes signals in the digital domain, no D/A & A/D converter is required between data unit 34 and digital cellular transceiver 36 which means there is less degradation in signal quality.

Functionally, digital cellular transceiver 36 handles the cellular network, such as AMPS, signaling protocols needed to communicate with base station 14 and performs signal conditioning to communicate with a remote mobile unit through the base station. While digital cellular transceiver 36 directs, generates and processes the cellular protocols, system control unit 32 determines when to send the signals and what to do with the signals. Digital cellular transceiver 36 also includes a CODEC interface for communicating with CODEC 54.

Alternatively, digital cellular transceiver 36 may be replaced by an analog cellular transceiver. In that instance, D/A & A/D converter 38 and CODEC 54 are no longer needed. However, a D/A & A/D converter is needed between data pump 48 and analog cellular transceiver which replaces digital cellular transceiver 36 so that during data transmission, the digital signals from data pump 48 can be first converted into analog signals before entering into the analog cellular transceiver, and during data reception, the analog signals from the analog cellular transceiver can be converted into digital signals before the signals are sent to data pump 48. However, an analog cellular transceiver is typically inferior in performance to a digital cellular transceiver.

The components of a cellular communication system such as data unit 34, digital cellular transceiver 36 and system control unit 32 may be in one digital signal processing (DSP) chip, in one microprocessor chip, in a plurality of DSP chips or in a plurality of microprocessor chips. Whether wireless communication system 30 uses a single chip or several chips, there is only one system control unit so that all the components can operate under one operating system. Because the components such as data unit 34, audio unit 38 and digital cellular transceiver 36 are integrated and operate under one operating system, information can be passed between different components. Also, one component can adapt itself to the changes that occur in another component. For example, data pump 48 can adapt to impairments of the cellular line. When the characteristics of the control channels or the voice channels of the cellular line change, because system control unit 32 controls both data pump 48 and digital cellular transceiver 36, data pump 48 can modify its parameters to compensate for the distortion that occurs in the cellular line. Thus, because the various components are integrated and operate under one operating system, wireless communication system 30 can achieve a higher transmission rate and/or lower error rate.

Figure 3:
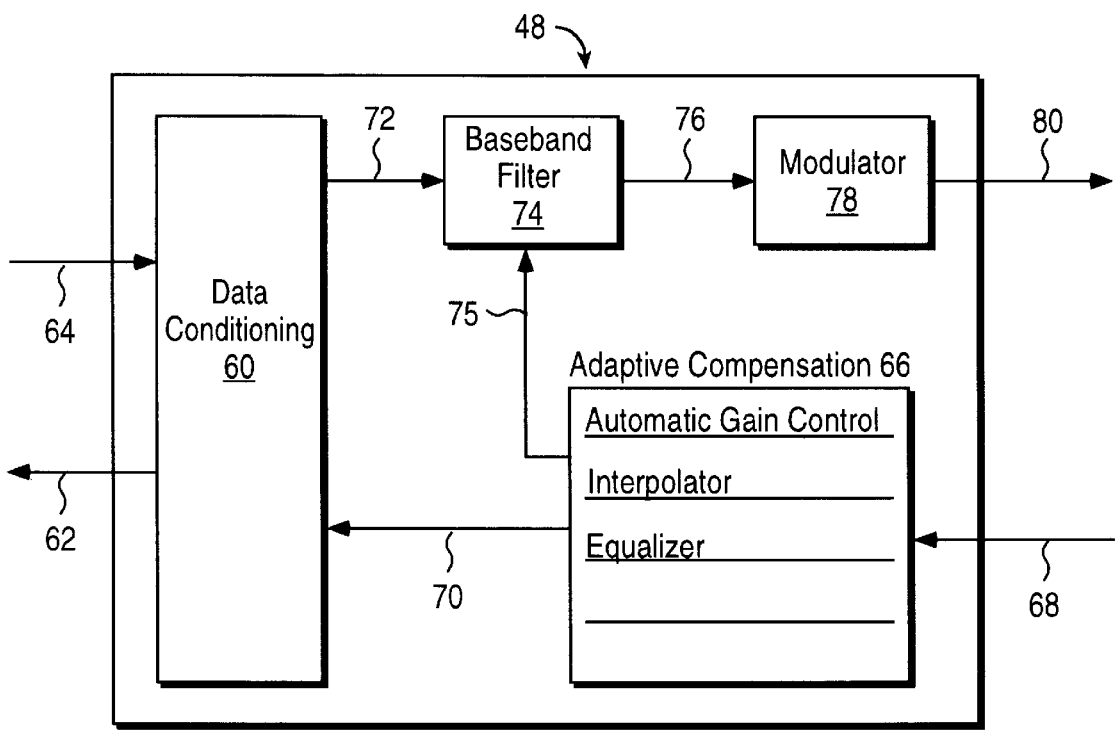
FIG. 3 is a detailed block diagram of the data pump of FIG. 2.

FIG. 3 is a block diagram of data pump 48 of FIG. 2. Data pump 48 includes a data conditioning module 60 which includes the functions of scrambling, descrambling, encoding, decoding, training and others.

Data conditioning module 60 transmits digital data to host interface 46 over data channel 62 and receives digital data via data channel 64.

An adaptive compensation module 66 receives digital data from digital cellular transceiver 36 over data channel 68. Adaptive compensation module 66 performs the function of compensating for distortion in the received signal on a continuous basis. That is, as the signal received over data channel 68 varies from a predetermined value, steps are taken by the adaptive compensation module 66 to introduce a signal which will cancel the distortion. Distortion can take several components. Each component of distortion might be analyzed separately and compensated for separately.

The adaptive compensation function includes automatic gain control which performs the function of compensating for variations in the attenuation distortion introduced by the transmission channel. That is, the receiving modem knows the level of signal to expect based upon the initial pre-connection communications between the modems at the two communicating nodes. If the signal amplitude varies from this standard, the gain being supplied in an amplification unit located in module 66 is adjusted to bring the gain back within a predetermined range.

The adaptive compensation function also includes an equalizer which filters out echoes introduced by messages encoded at different frequencies and traveling at different speeds as well as line noise. The equalizer examines sample pulses and measures the echoes and generates artificial echoes that cancel the ones that originally caused the distortion.

The adaptive compensation function also includes an interpolator which operates as follows. The interpolator takes input signal samples at a first rate (usually the free running local transmitter) and outputs an identical signal at a second sampling rate (which is usually locked to the remote transmitter clock)

The output of adaptive compensation module 66 is supplied via data channel 70 to data conditioning module 60.

Data conditioning module 60 supplies an output data over data channel 72 to baseband filter 74. Baseband filter 74 communicates with adaptive compensation module 66 via data channel 75. Baseband filter 74 is a digital filter performing the pre-distortion of the signal which is a function of the equalizer setting.

The output of baseband filter 74 is supplied over digital data channel 76 to modulator 78. Modulator 78 performs the function of modulating data bits into each signal change of the limited phone system bandwidth. The output of modulator 78 is supplied over data channel 80 to digital cellular transceiver 36 in FIG. 2.

Data pump 48 designed according to the present invention operates in the following manner. Since modem 12, shown in FIG. 1, is continually sending and receiving control signals to and from modem 18 over the control channel, data pump 48 is continually receiving control signals via data channel 68. The control signals received are of a known wave form. Thus, adaptive compensation module 66 can compare the received wave forms with a known wave form and determine the degree of distortion introduced by the transmission channel. Adaptive compensation module 66 then introduces signals that compensate the received signals for the distortion introduced by the transmission channel. A scaled and inverted form of this signal is supplied to baseband filter 74 for introduction into signals to be transmitted by modem 12. Data generated by host computer 10 in digital format passes through host interface 46 shown in FIG. 2 and to data conditioner 60 via data channel 64. After being conditioned, the host generated data passes to baseband filter 74 where it is combined with the pre-distortion signals received from adaptive compensation module 66.

Figure 4:
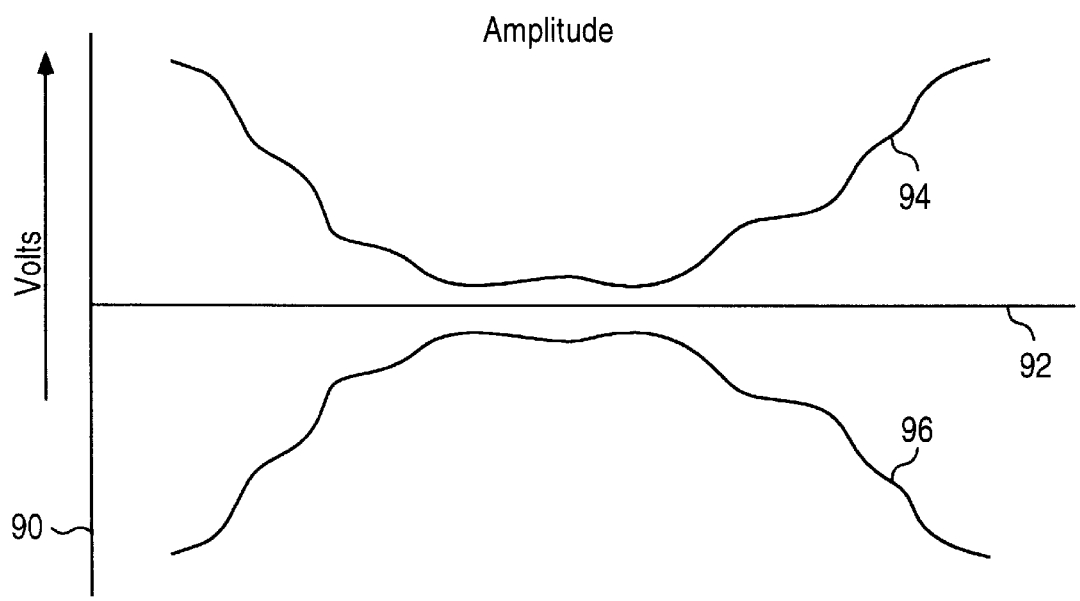
FIG. 4 is an analog representation of how the gain component of distortion is handled.
Figure 5:
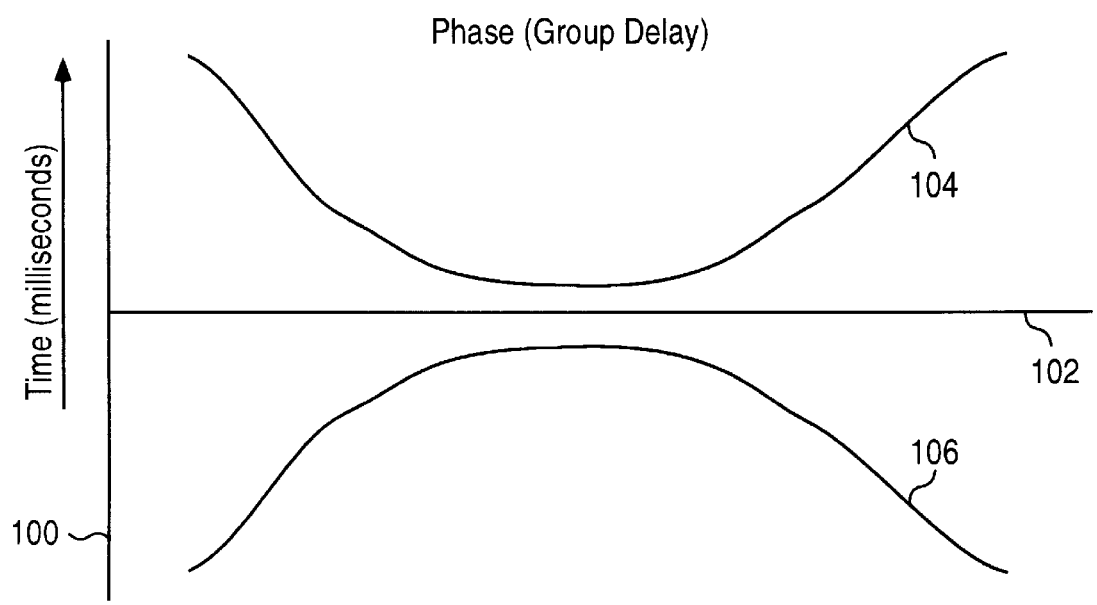
FIG. 5 is an analog representation of how the phase component of distortion is handled.

FIGS. 4 and 5 illustrates the concept of the invention in analog format. FIG. 4 is an analog representation of how the gain component of distortion is handled. Referring now to FIG. 4, the units of vertical axis 90 is volts. The units of horizontal axis 92 is frequency. Thus each point on curve 94 represents the amount of gain compensation at a particular frequency that adaptive compensation module 66 introduces into the received signal to compensate for gain attenuation introduced by the transmission channel. Curve 96 represents the distortion of the channel. Curve 96 is the inverse of curve 94. Each point on curve 94 represents the amount of gain that baseband filter 74 introduces into signals to be transmitted so that the signal received by modem 18, in FIG. 1, is substantially free of attenuation distortion.

In a similar manner, FIG. 5 is an analog representation of how the phase component of distortion is handled. Referring now to FIG. 5, the units of vertical axis 100 is milliseconds. The units of horizontal axis 102 is frequency. Thus each point on curve 106 represents the amount of phase compensation at a particular frequency that adaptive compensation module 66 introduces into the received signal to compensate for phase distortion introduced by the transmission channel. Curve 104 is the inverse of curve 106. Each point on curve 106 represents the amount of phase shift that baseband filter 74 introduces into signals to be transmitted so that the signal received by modem 18, in FIG. 1, is substantially free of phase distortion. Curve 104 represents the group delay distortion of the channel.

Of course this is all done in the digital domain. Thus all compensation to any wave form is actually accomplished by adjusting the values of numbers in digital format that represent the wave form.

Figure 6:
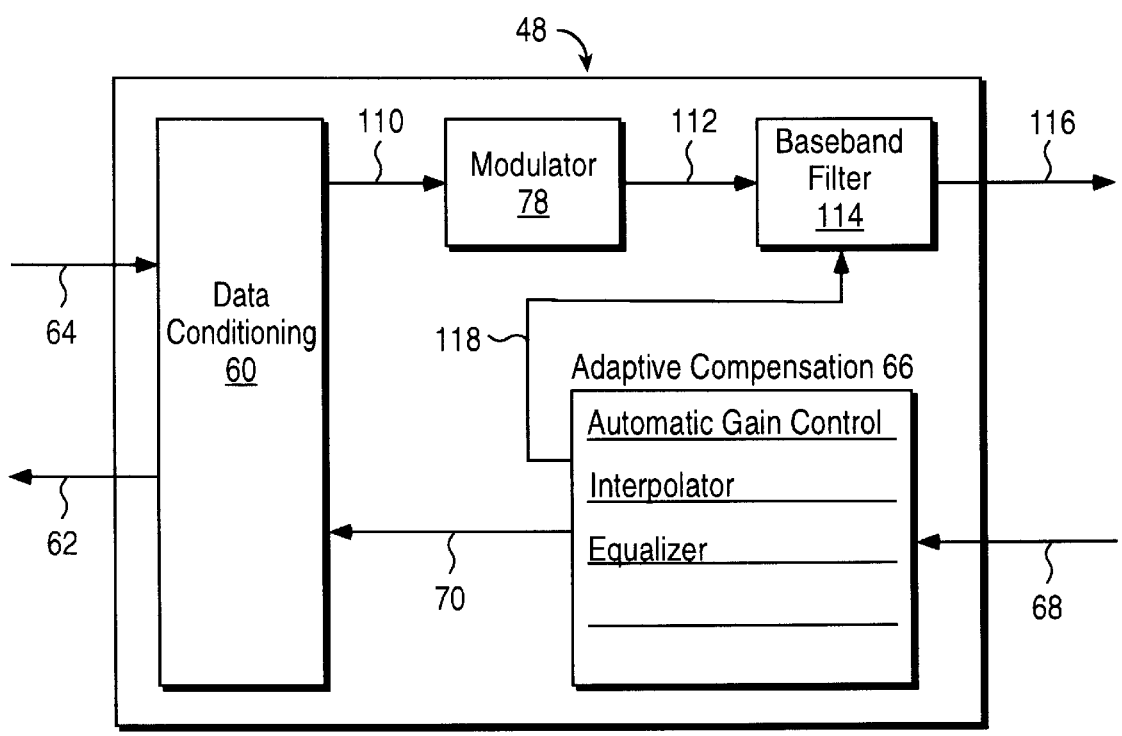
FIG. 6 is a block diagram of the data pump having an alternative configuration.

FIG. 6 is a block diagram of data pump 48 having an alternative configuration. Common reference numerals with FIG. 3 refer to the same components. The difference between the system of FIG. 3 and that of FIG. 6 is that in the system of FIG. 6, the input of modulator 78 is connected directly to data conditioning unit 60 via data channel 110, the output of modulator 78 is connected via data channel 112 to the input of passband filter 114 and the output of passband filter 114 is connected via data channel 116 to digital cellular transceiver 36 of FIG. 2. Passband filter 114 communicates with adaptive compensation module 66 via data channel 118. Thus, base band filter 74 of FIG. 3 has been deleted from the system and passband filter 114 has been added. Also, passband filter works on the output of modulator 78 while baseband filter 74 modifies the input to modulator 78. Note that implementations of FIG. 3 and FIG. 6 will produce identical output. The signal 80 of FIG. 3 will be identical to the signal 116 of FIG. 6.

In the foregoing detailed description, numerous specific details are set forth such as detailed block diagrams and signal flow charts to provide a thorough understanding of the present invention. It will be appreciated, however, by one having ordinary skill in the art that the present invention may be practiced without such specific details. In other instances, well-known control structures and gate level circuits have not been shown in detail so as not to obscure the present invention. Those of ordinary skill in the art, once provided with the various functions below, will be able to implement the necessary logic circuits without undue experimentation.

While the present invention has been particularly described with reference to the various figures and embodiments, it should be understood that these are for illustration only and should not be taken as limiting the scope of the invention. Many changes and modifications may be made to the invention, by one having ordinary skill in the art, without departing from the spirit and scope of the invention.

What is claimed is:

1. A system to reduce a distortion in a communication between a first and a second modem coupled together by a transmission channel that is in part wireless, wherein said communication includes transmissions and receptions by each modem, the system comprising:

an adaptive compensation module associated with said first modem to repeatedly measure the distortion in a wireless communication protocol control signal received at said first modem, said wireless communication protocol control signal being inherent in said wireless part of said transmission channel, and having a known waveform, said adaptive compensation module to unilaterally and repeatedly generate a pre-distortion signal based upon said measured distortion but transformed such that said pre-distortion signal tends to cancel said distortion; and a pre-distortion filter associated with said first modem to introduce into said transmissions from said first modem said pre-distortion signal.

2. The system of claim 1 wherein said pre-distortion filter comprises a baseband filter.

3. The system of claim 1 wherein said pre-distortion filter comprises a passband filter.

4. The system of claim 1 wherein said adaptive compensation module includes automatic gain control.

5. The system of claim 1 wherein said adaptive compensation module includes equalization.

6. The system of claim 1 wherein said adaptive compensation module includes interpolation.

7. The system of claim 1 wherein said modem comprises:

a data pump to perform modem signal processing;

a cellular transceiver communicatively coupled to said data pump to perform cellular signaling protocols and signal conditioning;

a radio transceiver communicatively coupled to said cellular transceiver to transmit and receive control commands and radio waves; and a single system control unit to control said data pump, said cellular transceiver, and said radio transceiver so that said data pump, said cellular transceiver, and said radio transceiver operate under a single operating system.

8. The system of claim 7 wherein both said data pump and said cellular transceiver operate in one domain.

9. The system of claim 8 wherein said modem further includes an audio unit.

10. The system of claim 7 wherein said data pump and said cellular transceiver operate in a digital domain.

11. The system of claim 10 wherein said data pump, said cellular transceiver and said system control unit are in a single digital signal processing chip or in a single microprocessor chip.

12. A communication system connected to a host computer for communicating digital data over a telephone network that is in part wireless, said system comprising:

a radio transceiver for transmitting and receiving radio frequency signals;

a D/A and A/D unit communicating with said radio transceiver, said D/A and A/D unit being adapted to convert information between the digital and analog domains;

a digital cellular transceiver communicating with said D/A and A/D unit, said digital cellular transceiver being adapted to convert data signals to digital cellular signals;

a data conditioning unit communicating with said host computer;

an adaptive compensation module communicating with said digital cellular transceiver to receive digital cellular signals that have been converted to data signals and communicates with said data conditioning unit to supply an output signal thereto, said adaptive compensation module being adapted to generate a distortion signal that compensates for distortion in said data signals on a continuous basis, said adaptive compensation unit being further adapted to generate a pre-distortion signal that is a scaled and inverted form of said distortion signal;

a baseband filter communicating with said data conditioning unit to receive conditioned data originating in said host computer therefrom and communicating with said adaptive compensation module to receive said pre-distortion signal therefrom, said base band filter being adapted to combine said conditioned data and said pre-distortion signal;

a modulator communicating with said baseband filter and said digital cellular transceiver, said modulator being adapted to modulate data into the bandwidth of said telephone network.

13. A method to reduce distortion in a communication between a first and a second modem coupled together by a transmission channel that is in part wireless, wherein said communication includes a transmit signal and a receive signal at each modem, said method comprising:

monitoring a wireless communication protocol control signal inherent in said wireless part of said transmission channel, and having a known waveform at said first modem;

measuring said distortion in said wireless communication protocol control signal repeatedly;

repeatedly and unilaterally generating a pre-distortion signal that is a scaled and inverted form of said measured distortion by said first modem; and introducing said pre-distortion signal to said transmit signal from said first modem.

14. The method of claim 13 wherein said measuring the distortion in said wireless communication protocol control signal at said first modem includes measuring the gain of said receive signal.

15. The method of claim 13 wherein said measuring the distortion in said wireless communication protocol control signal at said first modem includes measuring the echoes included in said receive signal.

* * * * *

UNITED STATES PATENT AND TRADEMARK OFFICE
CERTIFICATE OF CORRECTION

PATENT NO.    : 5,911,115
DATED         : June 8, 1999
INVENTOR(S)   : Nair et al.

It is certified that error appears in the above-identified patent and that said Letters Patent is hereby corrected as shown below:

<u>Title page,</u>
Item [57], ABSTRACT,
Line 2, delete "aptitude" and insert -- amplitude --.

Signed and Sealed this

Sixth Day of July, 2004

JON W. DUDAS
*Acting Director of the United States Patent and Trademark Office*